United States Patent
Chace

(10) Patent No.: US 9,885,802 B2
(45) Date of Patent: Feb. 6, 2018

(54) DOWNHOLE CEMENT EVALUTION USING PULSED NEUTRON MEASUREMENTS

(71) Applicant: David M. Chace, Houston, TX (US)

(72) Inventor: David M. Chace, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 385 days.

(21) Appl. No.: 14/451,584

(22) Filed: Aug. 5, 2014

(65) Prior Publication Data
US 2015/0090871 A1   Apr. 2, 2015

Related U.S. Application Data

(60) Provisional application No. 61/885,204, filed on Oct. 1, 2013.

(51) Int. Cl.
*G01V 5/10* (2006.01)
*E21B 47/00* (2012.01)

(52) U.S. Cl.
CPC .......... *G01V 5/101* (2013.01); *E21B 47/0005* (2013.01)

(58) Field of Classification Search
CPC ..................................................... G01V 5/101
USPC ..................................................... 250/269.7
See application file for complete search history.

(56) References Cited

U.S. PATENT DOCUMENTS

| 4,092,536 A | 5/1978 | Smith |
| 6,005,244 A * | 12/1999 | Vaeth ..................... G01V 5/101 250/269.2 |
| 2004/0222368 A1 | 11/2004 | Odom et al. |
| 2005/0067563 A1 | 3/2005 | Gilchrist et al. |
| 2009/0108210 A1* | 4/2009 | Stephenson ............ G01V 5/107 250/391 |
| 2012/0326017 A1 | 12/2012 | Nikitin et al. |

FOREIGN PATENT DOCUMENTS

EP     0895097 B1     10/2006

OTHER PUBLICATIONS

Notification of Transmittal of the International Search Report and the Written Opinion of the International Searching Authority, or the Declaration; PCT/US2014/053776; Dec. 9, 2014, 11 Pages.

* cited by examiner

*Primary Examiner* — Casey Bryant
(74) *Attorney, Agent, or Firm* — Cantor Colburn LLP

(57) ABSTRACT

Estimating cement voids in between a casing and a borehole wall of a borehole penetrating the earth formation includes forming with a computing device an actual ratio of radiation induced by a neutron source and measured by a first detector and a second detector when the tool is at two or more different locations in the borehole. A relationship between the actual ratio and the porosity at each of the two or more different locations is used and compared to two different cases of estimates of the ratio. Based on the comparison, an estimate of the cement voids at the two or more locations.

11 Claims, 5 Drawing Sheets

DOWNHOLE CEMENT EVALUTION USING PULSED NEUTRON MEASUREMENTS

CROSS REFERENCE TO RELATED APPLICATIONS

This application claims the benefit of an earlier filing date from U.S. Provisional Application Ser. No. 61/885,204 filed Oct. 1, 2013, the entire disclosure of which is incorporated herein by reference.

BACKGROUND OF THE INVENTION

1. Field of the Invention

The present invention relates to techniques for estimating properties of cement in a borehole and, in particular, to estimating the amount of cement present at a particular location in the borehole.

2. Description of the Related Art

Downhole production boreholes utilized in subterranean operations typically utilize casings disposed therein to protect the borehole from downhole pressures, chemical reactions and other conditions and prevent failures such as borehole collapse, burst and tensile failures. Casings can also be used to define production zones in various portions of the borehole. In some cases, a layer of cement is deposited between the casing and a wall of the borehole. The cement may bond to either or both the casing and the borehole.

Casing monitoring and evaluation techniques are important tools in maintaining the integrity of the casing, and in turn maintaining the integrity of the borehole. Typical evaluation and maintenance procedures involve interrogating the casing and cement that is used to bond the casing to the borehole wall to determine whether voids are present between the casing and the borehole wall. The voids can be formed if the cement is damaged by chemicals used in the oil production process and result in incomplete or thin cement walls. Also, in some cases, the procedures utilized to deposit the cement can result in uneven distribution of the cement.

Typical methods for detecting cement voids include interrogating the casing and cement with acoustic signals to detect microannuli and other openings formed between the casing and the borehole wall. Detected microannuluses are typically corrected via methods such as applying hydrostatic pressure to the interior of the casing. Such detection methods can be inefficient and inaccurate in that they may be unable to effectively differentiate between an insignificant microannulus and a true void between the casing and the cement that can compromise the hydraulic seal formed therebetween.

Well logging is a technique used to perform measurements of an earth formation. In well logging, a logging instrument or tool is conveyed through a borehole penetrating the earth formation. The logging tool is configured to perform the measurements from within the borehole. Measurements are typically performed at various depths in the borehole. The measurements are associated with the depth at which they were performed to produce a log. Data from some of the logs may be used to determine relative amounts (i.e., saturation) of oil, gas or water in the pores of the earth formation.

At present, well logging is performed separately from the void detection process.

BRIEF SUMMARY OF THE INVENTION

In one embodiment, a method for estimating cement voids in between a casing and a borehole wall of a borehole is disclosed. The method includes: conveying a tool through a borehole penetrating the earth formation; irradiating an earth formation external to the borehole wall with neutrons from a neutron source disposed at the tool; forming measurements of radiation emitted from the earth formation resulting from the irradiating using a first detector and a second detector in the tool, when the tool is in two or more different locations in the borehole; forming an actual ratio of radiation measured the by first detector and the second detector at two or more of the different locations; determining a porosity of the earth formation at the two or more locations; forming a relationship between the actual ratio and the porosity at each of the two or more different locations in the borehole; forming an estimate, via numerical techniques, of the ratio versus porosity, the estimate including at least a first case and second case; comparing the relationship at the two more locations to both the first and second cases at corresponding locations; and determining an estimate of the cement voids at the two or more locations based on the comparing.

According to another embodiment, a method of estimating cement voids in between a casing and a borehole wall of a borehole penetrating the earth formation is disclosed. The method includes: forming with a computing device an actual ratio of radiation measured by a first detector and a second detector when the tool is two or more different locations in the borehole, the first and second detector being contained in a tool conveying a tool through the borehole penetrating the earth formation; determining a porosity of the earth formation at the two or more locations; forming a relationship between the actual ratio and the porosity at each of the two or more different locations; forming an estimate, via numerical techniques, of the ratio versus porosity, the estimate including at least a first case and second case; comparing with the computing device the relationship at the two more locations to both the first and second cases at corresponding locations; and determining an estimate of the cement voids at the two or more locations based on the comparing.

According to another embodiment, an apparatus for estimating cement voids in between a casing and a borehole wall of a borehole penetrating the earth formation includes a tool adapted for conveyance though the borehole, the tool including a neutron source for irradiating an earth formation external to the borehole wall with and a first and second detector for forming measurements of radiation emitted from the earth formation resulting from the irradiating at different locations in the borehole; and one or more processors. The may be configured for: forming an actual ratio of radiation measured the by first detector and the second detector when the tool is in two or more of the different locations; determining a porosity of the earth formation at the two or more locations; forming a relationship between the actual ratio and the porosity at each of the two or more different locations; forming an estimate, via numerical techniques, of the ratio versus porosity, the estimate including at least a first case and second case; comparing the relationship at the two more locations to both the first and second cases at corresponding locations; and determining an estimate of the cement voids at the two or more locations based on the comparing.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

Disclosed are exemplary embodiments of techniques for detecting cement voids using a well logging tool. The techniques, which include method and apparatus, utilize a pulsed-neutron logging instrument or tool to obtain measurements of the earth formation through a cased borehole (including cement) penetrating the earth formation. The measurements can be interpreted to determine whether voids exist in the cement.

In one embodiment, the earth formation is irradiated with neutrons from a neutron source disposed at the logging tool in the borehole. Radiation in the form of gamma rays is emitted from the formation due to interactions between the neutrons and materials in the formation. The emitted radiation is detected (i.e. measured) by at least two detectors spaced different distances from the neutron source. In one embodiment, a ratio of inelastic gamma rays measured by the two detectors (referred to herein as "RIN") is utilized to detect the presence, and in some embodiments, the extent, of voids in the cement.

The teachings herein rely at least in part that Monte Carlo modeling of the RIN response for wellbores with cemented and un-cemented (e.g., fluid-filled) annuli show that the RIN response will be higher in a cemented condition and lower in an uncemented (or fluid-filled) annular condition. Accordingly, embodiments disclosed herein utilize cemented and un-cemented Monte Carlo RIN responses (which are functions of porosity, at least) to create an envelope which represents the dynamic range of the RIN response over the range from 0 to 100 percent cement volume in the casing-borehole annulus. A measured RIN value is normalized so that it is contained within the range and the relative position of RIN within the range can be used to determine the amount of cement present.

Figure 1:
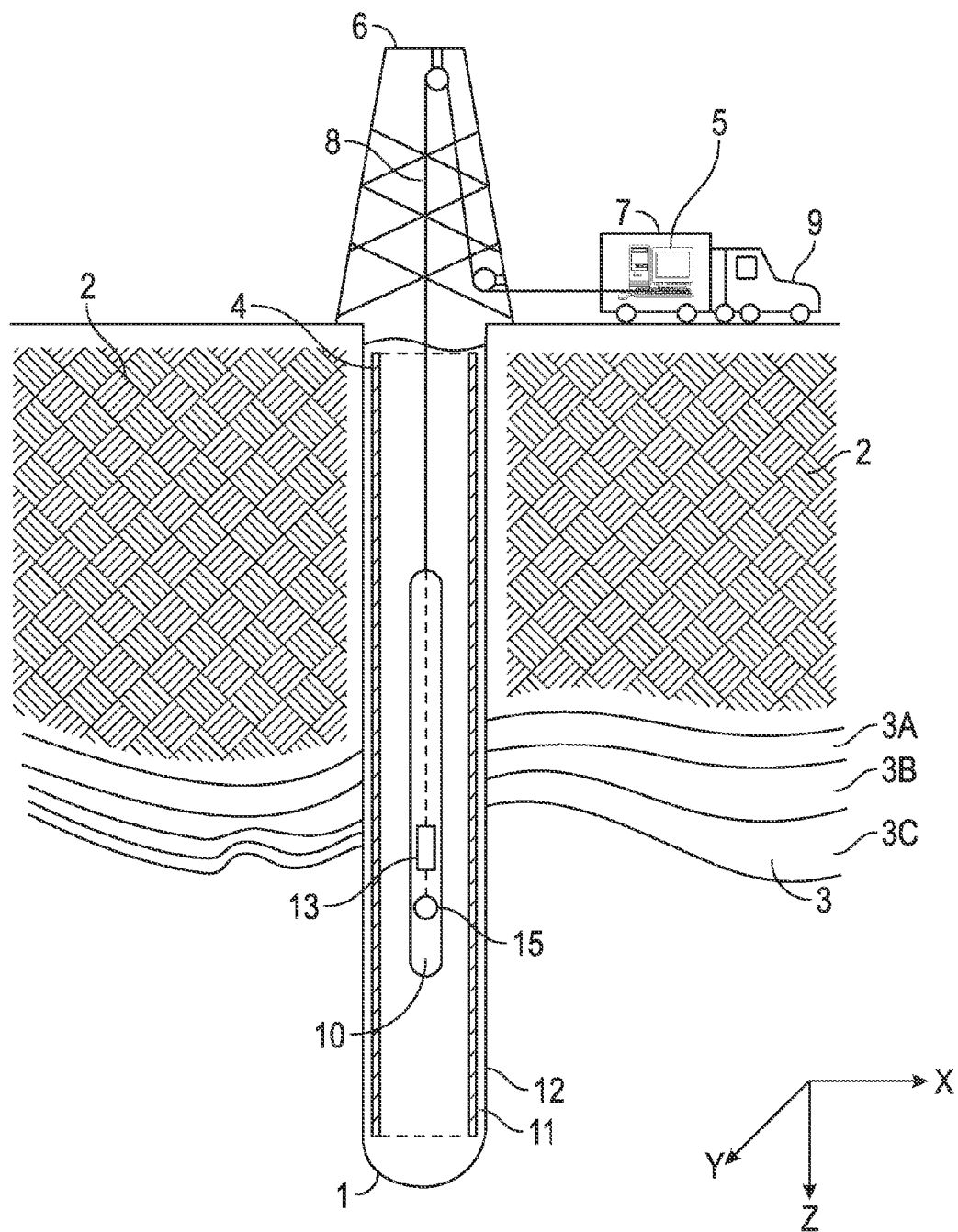
FIG. 1 illustrates an exemplary embodiment of a pulsed-neutron logging instrument disposed in a borehole penetrating an earth formation.

Apparatus for implementing the techniques disclosed herein is now discussed. Reference may now be had to FIG. 1. FIG. 1 illustrates an exemplary embodiment of a well logging instrument 10 (also referred to as a "tool") for wireline logging shown disposed in a wellbore 1 (also referred to as a borehole). The wellbore 1 generally traverses a formation 3 that can include various intervals or layers shown as 3A, 3B and 3C. One skilled in the art will recognize that the various geological features as may be encountered in a subsurface environment may be referred to as "formations." As used herein the term "formation" also includes the subsurface materials that makeup the formation. For example, the formation can include a rock matrix of pores filled with one or more fluids such as water, oil or gas and the like. The fluids can also include an enhanced oil recovery fluid such as a polymer. Non-limiting examples of materials forming the rock matrix include sandstone, limestone, dolomite, or combinations of other rocks or minerals. As a matter of convention, a depth of the wellbore 1 is described along a Z-axis, while a cross-section is provided on a plane described by an X-axis and a Y-axis. Prior to well logging with the logging instrument 10, the wellbore 1 is drilled into the Earth 2 using a drilling rig.

The logging instrument 10 is lowered into the wellbore 1 using a wireline 8 deployed by a derrick 6 or similar equipment. Generally, the wireline 8 includes suspension apparatus, such as a load bearing cable, as well as other apparatus. The other apparatus may include a power supply, a communications link (such as wired or optical) and other such equipment. Generally, the wireline 8 is conveyed from a service truck 9 or other similar apparatus (such as a service station, a base station, etc. . . . ). Often, the wireline 8 is coupled to topside equipment 7. The topside equipment 7 may provide power to the logging instrument 10, as well as provide computing and processing capabilities for at least one of control of operations and analysis of data. Hence, the topside equipment 7 includes a computer processing system 5. In another embodiment, the logging tool 10 is conveyed through the borehole 1 by a drill string or coiled tubing while the borehole 1 is being drilled in a technique referred to as logging-while-drilling (LWD). In LWD, the logging tool 10 performs measurements while the borehole is being or during a temporary halt in drilling. In another embodiment referred to as "memory logging," measurements are stored in a removable or downloadable memory disposed in the logging tool 10. Hence, the measurements can be retrieved when the logging tool 10 is removed from the wellbore 1.

The wellbore 1 as shown in FIG. 1 is lined with a casing 4 to preserve the integrity of the wellbore 1. Non-limiting embodiments of materials for the casing 4 include metals such as steel. In completing the well, it is advantageous to install the casing 4 quickly after the wellbore 1 is drilled before damage can occur. Thus, time may not be available to perform open well logging (i.e., without a casing). Therefore, the logging tool 10 includes pulsed-neutron logging components 15 for logging through the casing 4. The pulsed-neutron logging components 15 may communicate with downhole electronics 13 and/or the topside equipment 7. As shown in FIG. 1, an annulus 11 is present between the casing 4 and the walls 12 of the wellbore 1. This annulus 11 is filled with concrete in some instances. Embodiments disclosed herein utilize the logging tool 10 to determine the location of voids in the concrete in the annulus 11.

Figure 2:
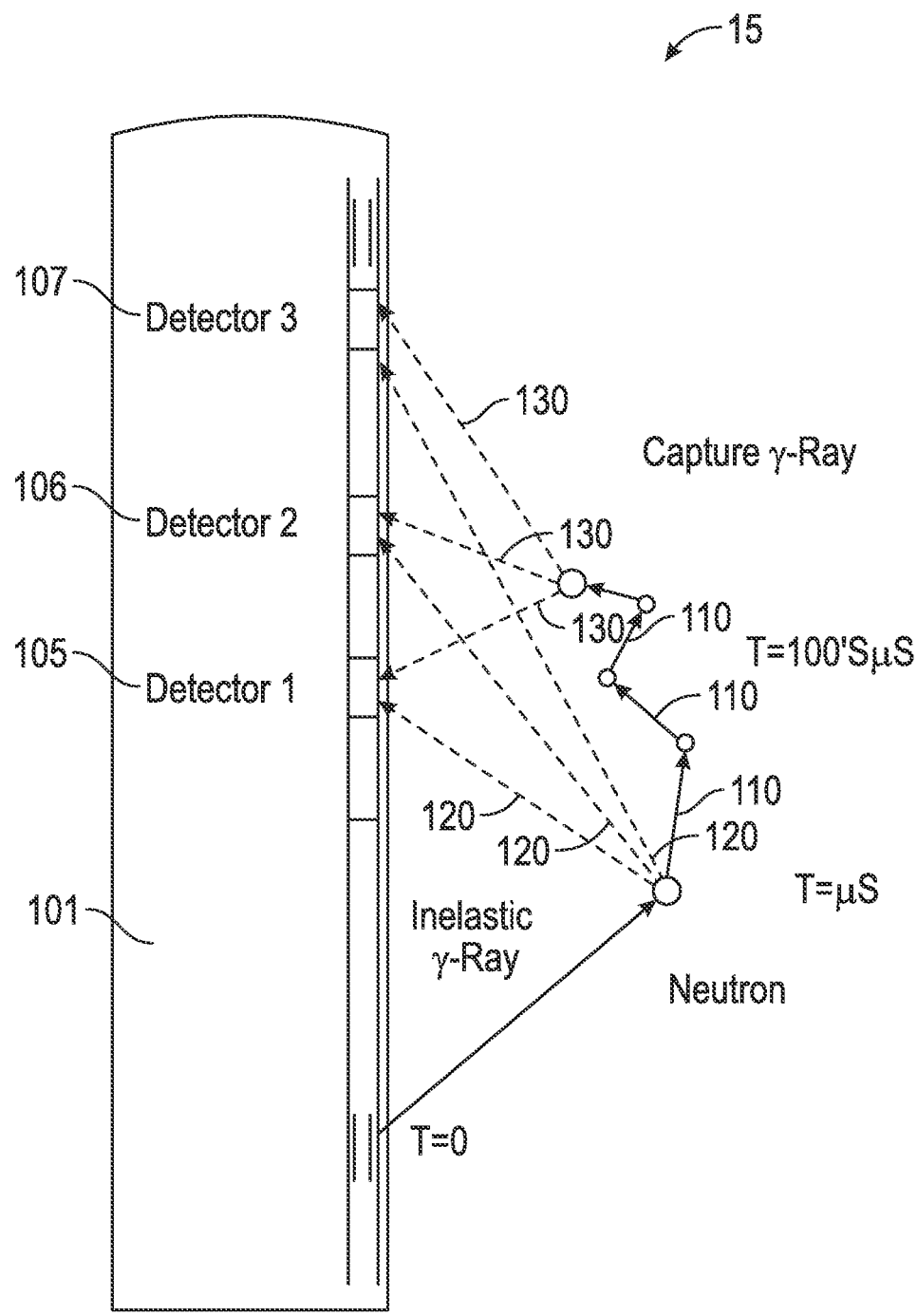
FIG. 2 illustrates an exemplary embodiment of pulsed-neutron logging components disposed at the pulsed-neutron logging instrument.

Reference may now be had to FIG. 2, which illustrates an exemplary embodiment of the pulsed-neutron logging components 15 in the logging tool 10. The components 15 include a neutron source 101 and three spaced apart detectors described below. The number of detectors shown in the embodiment of FIG. 2 is only an example of the number of detectors employed in an embodiment of the present invention. It is not a limitation on the scope of the present invention. In one embodiment, the pulsed-neutron logging components 15 of the present invention may include two or more detectors. The neutron source 101 may be pulsed at different frequencies and modes for different types of measurements. The short-spaced (SS) detector 105 is closest to the source 101. The long-spaced (LS) detector is denoted by 106, and the furthest detector 107 is referred to as the extra-long spaced (XLS) detector. Fast neutrons (approximately 14 MeV) are emitted from the source 101 and enter the borehole and formation, where they undergo several types of interactions. During the first few microseconds (μs), before they lose much energy, some neutrons are involved in inelastic scattering with nuclei in the borehole and formation and produce gamma rays. These inelastic gamma rays 120 have energies that are characteristic of the atomic nuclei that produced them. The atomic nuclei found in this environment include, for example, carbon, oxygen, silicon, calcium, and some others. It can be appreciated that the gamma ray detectors can be disposed within a body of the logging tool 10 or external to the body (e.g., such as either above or below the tool).

Two or more gamma-ray detectors are employed, in one or more modes of operation. Such modes include, but are not limited to, a pulsed neutron capture (e.g., sigma) mode, a pulsed neutron inelastic (e.g., carbon/oxygen or C/O) mode, and a pulsed neutron holdup imager mode. In a pulsed neutron capture mode, for example, the tool pulses at 1 kHz, and records a complete time spectrum for each detector. An energy spectrum is also recorded for maintaining energy levels. Time spectra from short-spaced and long-spaced detectors can be processed individually to provide traditional thermal neutron capture cross section sigma information, or the two spectra can be used together to automatically correct for borehole and diffusion effects and produce results substantially approximating intrinsic formation sigma values.

In the pulsed neutron inelastic (C/O) mode, the instrument pulses at 10 kHz, for example, and records full inelastic and capture gamma ray energy spectra from each detector. These data are processed to determine elemental ratios including carbon/oxygen and calcium/silicon from the inelastic spectra and silicon/calcium from the capture spectra.

After just a few microseconds (p), most of the neutrons emitted by the source 101 are slowed by either inelastic or elastic scattering until they reach thermal energies, about 0.025 eV. This process is illustrated schematically in FIG. 2 as the sequence of solid arrows 110. At thermal energies, neutrons continue to undergo elastic collisions, but they no longer lose energy on average. A few μs after the neutron generator shuts off, the process of thermalization is complete. Over the next several hundred μs, thermal neutrons are captured by nuclei of various elements—again producing gamma rays, known as capture gamma rays 130. A capture gamma ray energy spectrum yields information about the relative abundances of these elements. The inelastic gamma rays are depicted by 120. Because inelastic gamma rays 120 are generated before the capture gamma rays 130, it is possible to identify and measure separately to obtain inelastic gamma ray spectra and capture gamma ray spectra.

Calculating or determining the mathematical parameters is now discussed. The mathematical parameters can be calculated or determined from the measurements made by one or more of the various radiation detectors. For example, a mathematical parameter also referred to herein as RIN is the ratio of the measurement of gamma rays detected by the SS detector 105 due to inelastic scattering to the measurement of gamma rays detected by the LS detector 106 due to inelastic scattering. Other examples of mathematical parameters include sigma or carbon/oxygen ratio, which can be measured using a single detector.

At each location (e.g., depth) where a RIN value is calculated, a porosity value may also be determined. The porosity can be determined based on measurements made at the same time as those from which the RIN was calculated or at another time. For instance, the porosity may be determined from a porosity log. As is known in the art, a porosity log illustrates the fraction or percentage of pore volume in a volume of rock. Most porosity logs use either acoustic or nuclear technology. Acoustic logs measure characteristics of sound waves propagated through the well-bore environment. Nuclear logs utilize nuclear reactions that take place in the downhole logging instrument or in the formation. The basic principles in forming a porosity log, or a porosity measurement utilizing nuclear technology, are well known to the skilled artisan are not discussed further herein.

Figure 3:
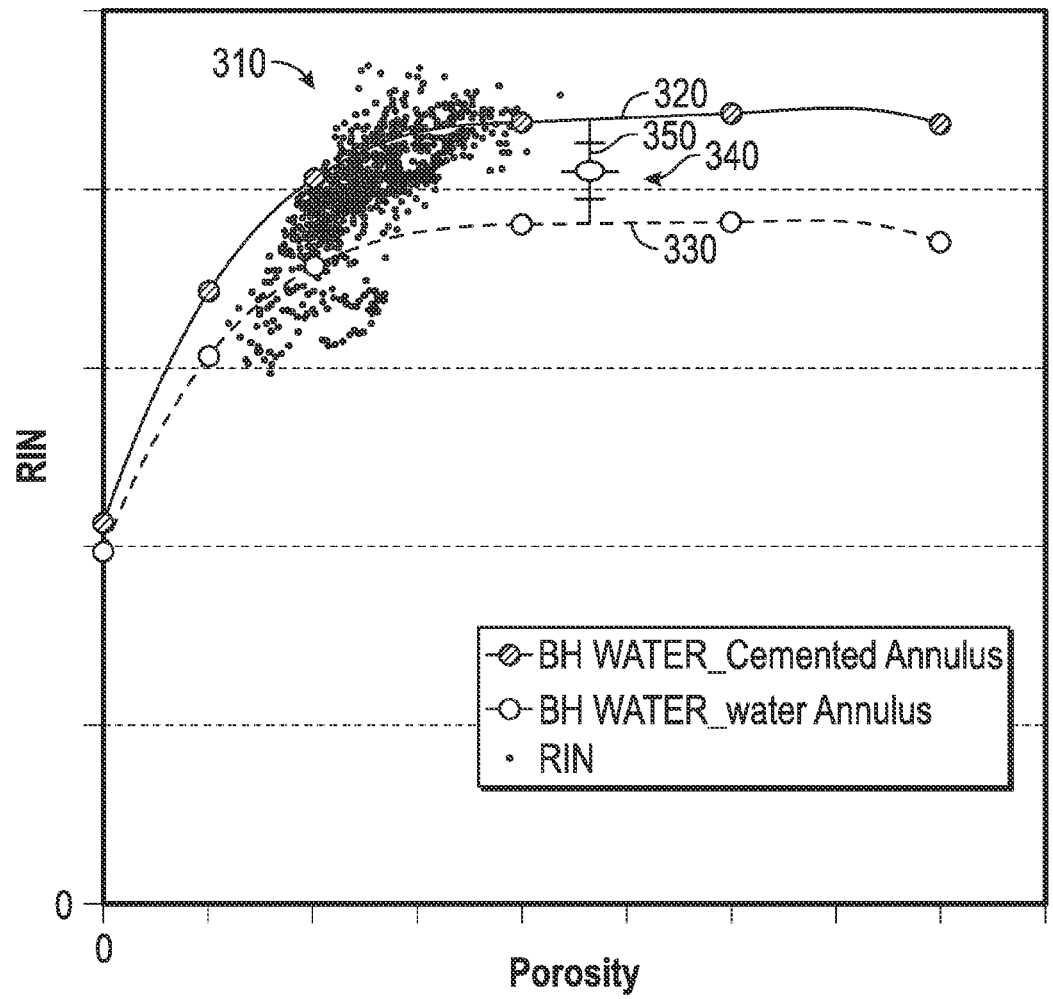
FIG. 3 illustrates an exemplary graph of a first ratio of gamma rays due to inelastic scattering received by a first detector to gamma rays due to inelastic scattering received by a second detector (e.g. RIN) versus porosity.

FIG. 3 illustrates an exemplary graph of RIN versus porosity. Several data points (collectively shown as dots 310) may be plotted on the graph with data for both RIN and porosity being collected by, for example, the logging tool 10 as described above. The determination of the value of porosity is well known in the art and may be gathered by, for example, the logging tool 10 at the same time the RIN data is collected or at another time.

In one embodiment, a Monte Carlo simulation was used to develop equations representing predicted RIN to porosity values for the case where the annulus is completely (100%) filled with cement (trace 320) and completely devoid (0%) of cement (trace 330). In FIG. 3, trace 330 assumes that the annulus is filled with water. Of course, other elements (e.g. oil) could be assumed to be in the annulus. According to one embodiment, the trace 330 is created assuming that a liquid (e.g. water, oil, a mixture of water and oil, etc.) fills the annulus and that no concrete is present in the annulus. In FIG. 3 the data points 310 are "raw" and have not been adjusted.

Figure 4:
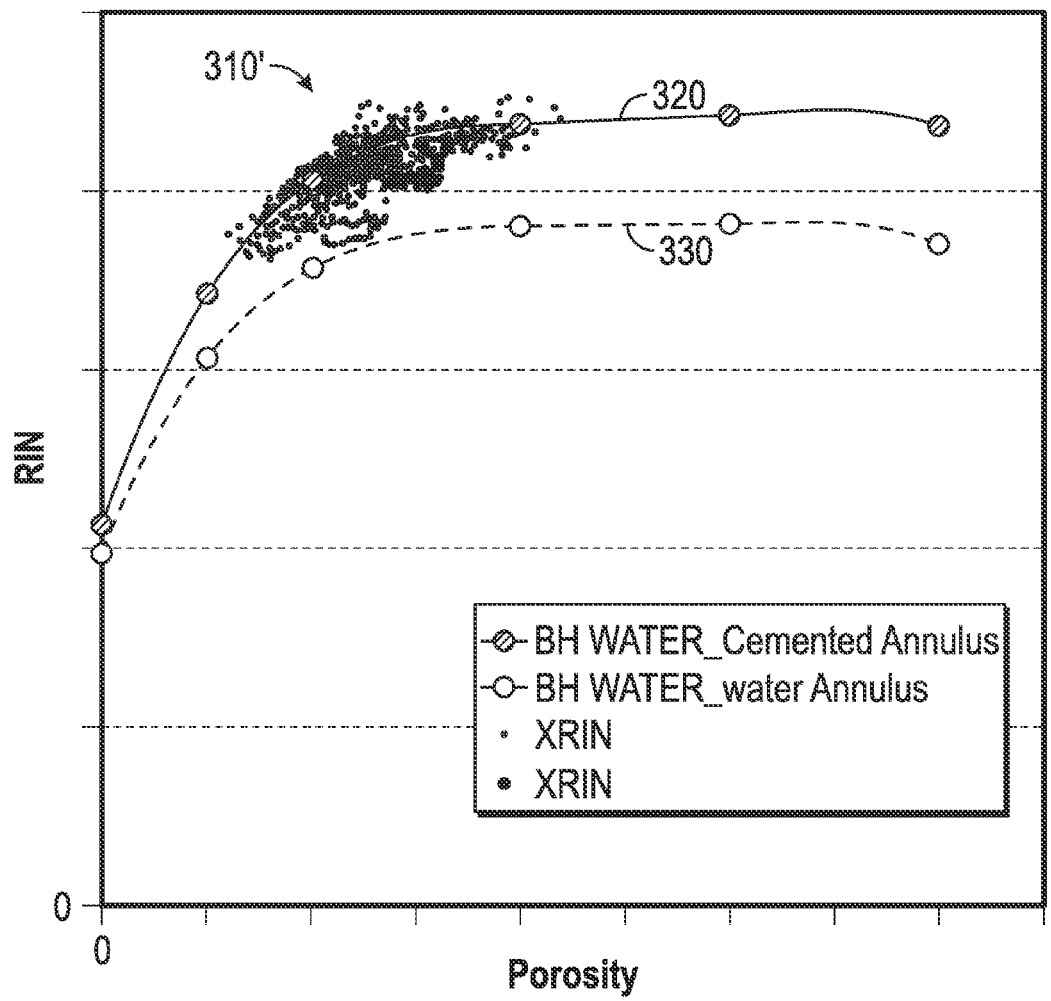
FIG. 4 illustrates an exemplary graph of the corrected first ratio of gamma rays due to inelastic scattering received by a first detector to gamma rays due to inelastic scattering received by a second detector (e.g. RIN) versus porosity.

According to one embodiment, and as illustrated in FIG. 4, the data points 310 have been "fit" (e.g., adjusted or normalized) so that they lie near trace 320. In FIG. 4 the adjusted data points are referenced by reference numeral 310'. The fitting of the data points 310 to trace 320 can include, for example, adding an offset to the data points 310 to form adjusted data points 310'. As it is well known to the skilled artisan how to cause such adjustments (and others) to be made, further details or examples of how the adjustments are performed are not described herein.

A continuum (e.g. scale) between 0 and 100% can be established between traces 320 and 330 with trace 330 being 0% and trace 320 being 100%. In FIG. 4, an example of such a continuum is shown by scale 340. On scale 340, point 350 represents a 50% value. That is, a point that lies along scale 340 at point 350 would have 50% cement fill between the casing and borehole wall. Of course, the location of the scale 340? can be moved left or right based on a location of a point of interest and need, in practice, not actually be utilized. Of course, other types of scales, such as a non-linear scale, could be utilized.

Figure 5:
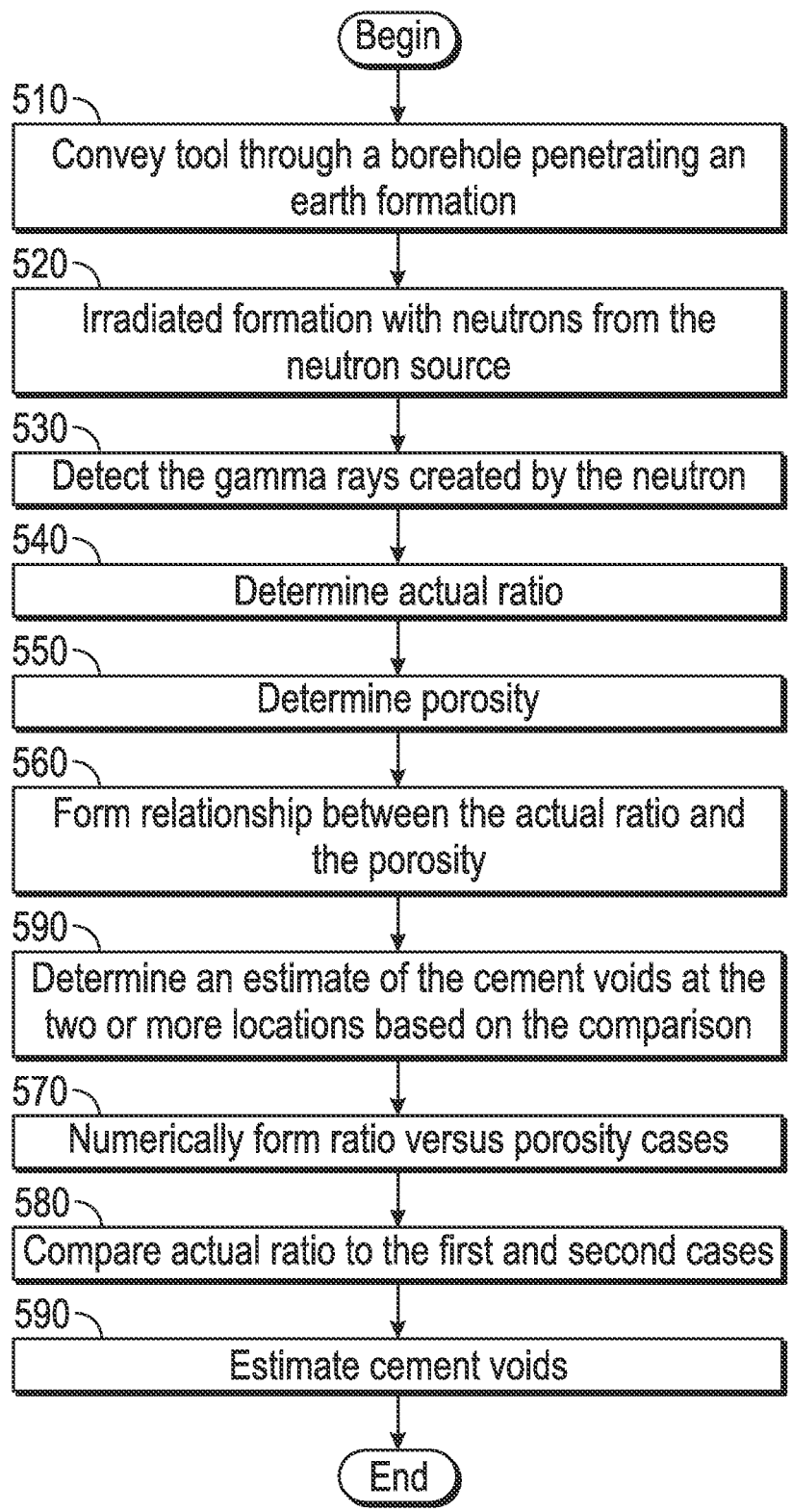
FIG. 5 shows a method according to one embodiment.

FIG. 5 is flow chart describing a method according to one embodiment. The method includes block 510 where a tool is conveyed through a borehole penetrating an earth formation. The tool may include a neutron source and, in one embodiment, a pulsed neutron source.

At block 520, the earth formation is irradiated with neutrons from the neutron source. As described above, the neutrons can cause gamma rays to be created due to their interactions with elements in the formation.

At block 530, two or more gamma ray detectors detect the gamma rays created by the neutron. In one embodiment, the detectors are the SS detector 105 that detects gamma rays due to inelastic scattering and LS detector 106 that detects gamma rays due to inelastic scattering as described above.

In one embodiment, the values are detected at two or more locations in the well and associated with those locations.

A ratio of the detected values is determined a block 540. In one embodiment, the ratio is RIN as described above and may be referred to herein as an "actual ratio" as it is formed from measured values.

At block 550, a porosity at different depths in borehole is determined. The determination may be made on the same tool run as block 530 or at a different time.

At block 560, a relationship between the actual ratio and the porosity (or a function of porosity) at each of the two or more different locations. An example of such a relationship graphically expressed in FIGS. 3 and 4 but it shall be understood that embodiments herein do not require the formation of such a graph or any type of graph at all.

At block 570, an estimate, formed by numerical techniques, of the ratio versus porosity. The estimate can include a first case and second case. Examples of these cases are shown by traces 320 and 330 above. In one embodiment, the numerical technique is a Monte Carlo model.

At block 580, the actual ratio is compared to the first and second cases. This may include determining how "close" to the first and second cases the actual ratio is. In terms of FIG. 4, the judging may include forming scale 340. The level may be expressed, for example, as a percentage. That percentage can represent, for example, the percentage of the space between the casing and borehole wall that is filled by concrete as indicated at block 590. Any percentage lower than 100% represents the possibility of a void.

While the techniques presented above used graphs to present and interpret data, it is recognized that the data may be processed by a processor such as may be included in the topside equipment 7 or the downhole electronics 13 without the need to present the data in graphical form. Further, any of the blocks shown above can include (1) graphical interpolation or extrapolation or (2) numerical calculation for the interpolation or extrapolation such as by matrix algebra or numerical substitution, as non-limiting embodiments. In order to aid a user in interpreting output from the apparatus, the data may be presented to the user in graphical form via a user interface.

In support of the teachings herein, various analysis components may be used, including a digital and/or an analog system. For example, the topside equipment 7, the computer processing system 5 or the downhole electronics 13 may include the digital and/or analog system. The system may have components such as a processor, storage media, memory, input, output, communications link (wired, wireless, pulsed mud, optical or other), user interfaces (keyboard, mouse, display, printout or other), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit, electromechanical unit, pulsed neutron generator or chemical neutron generator may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. The logging tool 10 is one non-limiting example of a carrier. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating cement voids in between a casing and a borehole wall of a borehole, the method comprising:
   conveying a tool through a borehole penetrating the earth formation;
   irradiating an earth formation external to the borehole wall with neutrons from a neutron source disposed at the tool;
   forming measurements of radiation emitted from the earth formation resulting from the irradiating using a first detector and a second detector in the tool, when the tool is in two or more different locations in the borehole;

forming an actual ratio of radiation measured by the first detector and the second detector at two or more of the different locations;
determining a porosity of the earth formation at the two or more locations;
forming an estimate, via numerical modeling techniques, of the ratio versus porosity, the estimate including at least a first case and second case;
comparing the actual ratio at the two more locations to both the first and second cases at corresponding locations; and
determining an estimate of the cement voids at the two or more locations based on the comparing;
wherein the first detector is a gamma ray detector and is spaced a distance apart from the second detector, the second detector is a gamma ray detector, and the ratio of radiation is a ratio of gamma rays due to inelastic scattering detected by the first detector to gamma rays due to inelastic scattering detected by the second detector.

2. The method of claim 1, further comprising:
adjusting the relationship to fit to the first case to form an adjusted relationship.

3. The method of claim 2, wherein determining includes determining whether the adjusted relationship is closer to the first case or the second case at the two or more locations.

4. The method claim 2, wherein determining includes forming a scale bounded by the first and second cases at the two or more locations, the first case representing 100% cement fill and the second case representing 0% fill.

5. The method of claim 1, wherein the numerical technique is a Monte Carlo model.

6. A method of estimating cement voids in between a casing and a borehole wall of a borehole penetrating the earth formation, the method comprising:
forming with a computing device an actual ratio of radiation measured by a first detector and a second detector when the tool is two or more different locations in the borehole, the first and second detector being contained in a tool conveying a tool through the borehole penetrating the earth formation, wherein the first detector is a gamma ray detector and is spaced a distance apart from the second detector, the second detector is a gamma ray detector, and the actual ratio is a ratio of gamma rays due to inelastic scattering detected by the first detector to gamma rays due to inelastic scattering detected by the second detector;
determining a porosity of the earth formation at the two or more locations;
forming an estimate, via numerical modeling techniques, of the ratio versus porosity, the estimate including at least a first case and second case;
comparing with the computing device the actual relationship and a porosity at the two more locations to both the first and second cases at corresponding locations; and
determining an estimate of the cement voids at the two or more locations based on the comparing.

7. The method of claim 6, further comprising:
adjusting the relationship to fit to the first case to form an adjusted relationship.

8. The method of claim 6, wherein determining includes determining whether the adjusted relationship is closer to the first case or the second case when the tool is in the two or more locations.

9. The method claim 8, wherein determining includes forming a scale bounded by the first and second cases at the two or more locations, the first case representing 100% cement fill and the second case representing 0% fill.

10. The method of claim 6, wherein the numerical technique is a Monte Carlo model.

11. An apparatus for estimating cement voids in between a casing and a borehole wall of a borehole penetrating the earth formation, the apparatus comprising: a tool adapted for conveyance though the borehole, the tool including a neutron source for irradiating an earth formation external to the borehole wall with and a first and second detector for forming measurements of radiation emitted from the earth formation resulting from the irradiating at different locations in the borehole; and one or more processors for: forming an actual ratio of radiation measured the by first detector and the second detector when the tool is in two or more of the different locations, wherein the first detector is a gamma ray detector and is spaced a distance apart from the second detector, the second detector is a gamma ray detector, and the actual ratio is a ratio of gamma rays due to inelastic scattering detected by the first detector to gamma rays due to inelastic scattering detected by the second detector; determining a porosity of the earth formation at the two or more locations; forming an estimate, via numerical modeling techniques, of the ratio versus porosity, the estimate including at least a first case and second case; comparing the actual ratio and a porosity at the two or more locations to both the first and second cases at corresponding locations; and determining an estimate of the cement voids at the two or more locations based on the comparing.

* * * * *